(12) United States Patent
Schmidt et al.

(10) Patent No.: US 6,612,608 B2
(45) Date of Patent: Sep. 2, 2003

(54) INSTRUMENT PANEL FOR A VEHICLE AND PROCESS FOR PRODUCTION THEREOF

(75) Inventors: Werner Schmidt, Alzenau (DE); Ulrich Rick, Roxheim (DE); Udo Wagner, Russelsheim (DE); Denis Losekamm, Aschaffenburg (DE)

(73) Assignee: Acts-Advanced Car Technology Systems GmbH & Co KG (DE)

( * ) Notice: Subject to any disclaimer, the term of this patent is extended or adjusted under 35 U.S.C. 154(b) by 0 days.

(21) Appl. No.: 09/834,252

(22) Filed: Apr. 12, 2001

(65) Prior Publication Data

US 2002/0000711 A1 Jan. 3, 2002

(30) Foreign Application Priority Data

Apr. 14, 2000 (DE) .......................................... 100 18 893

(51) Int. Cl.[7] .............................................. B60R 21/20
(52) U.S. Cl. .................................... 280/728.3; 280/732
(58) Field of Search .......................... 280/728.3, 728.2, 280/732, 752; 180/90; 296/70

(56) References Cited

U.S. PATENT DOCUMENTS

| 4,334,699 A | | 6/1982 | Patzelt et al. | |
|---|---|---|---|---|
| 5,096,220 A | * | 3/1992 | Nakajima | ................ 280/728.3 |
| 5,125,683 A | | 6/1992 | Nakajima | |
| 5,393,089 A | * | 2/1995 | Pakulsky et al. | ........ 280/728.3 |
| 5,564,733 A | | 10/1996 | Duenas et al. | |
| 5,639,115 A | * | 6/1997 | Kelley et al. | ............. 280/728.3 |
| 5,685,930 A | * | 11/1997 | Gallagher et al. | .......... 156/73.1 |
| 5,941,557 A | * | 8/1999 | Mullins, Jr. et al. | ..... 280/728.3 |
| 5,997,030 A | * | 12/1999 | Hannert et al. | .......... 280/728.3 |
| 6,079,733 A | * | 6/2000 | Towler | .................... 280/728.3 |
| 6,299,198 B1 | * | 10/2001 | Nakashima et al. | ..... 280/728.3 |
| 2001/0045728 A1 | | 11/2001 | Kansteiner et al. | |

FOREIGN PATENT DOCUMENTS

| DE | 29 05 618 | | 8/1980 | .......... B60R/21/10 |
|---|---|---|---|---|
| DE | 31 16 538 A1 | | 11/1982 | .......... B60R/21/10 |
| DE | 40 40 042 A1 | | 6/1991 | .......... B60R/21/20 |
| DE | 44 37 773 C1 | | 10/1995 | .......... B60K/37/04 |
| DE | 44 40 024 | * | 5/1996 | |
| DE | 198 37 421 A1 | | 2/2000 | .......... B60K/37/00 |

* cited by examiner

*Primary Examiner*—Peter C. English
(74) *Attorney, Agent, or Firm*—Pendorf & Cutliff

(57) ABSTRACT

The invention concerns an instrument panel for a vehicle having a form stable plastic carrier, a cover layer, optionally a layer including a foam material, and at least one flap-like tear-open part for the airbag of an airbag module. The flap-like tear-open part is defined by separation lines and a hinge area. The flap-like tear open part is provided with a reinforcement having at least one flexible layer. The layer is provided with through holes, which are perfused with the material of the carrier in such a manner, that the inner most carrier layer covers over the flexible layer in the manner of narrow or shallow elevations.

20 Claims, 2 Drawing Sheets

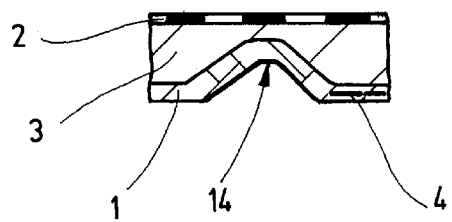
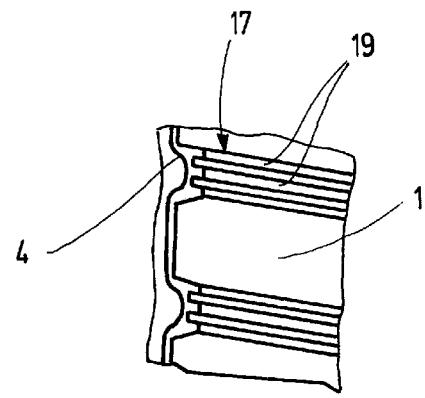
Fig.3   Fig.4
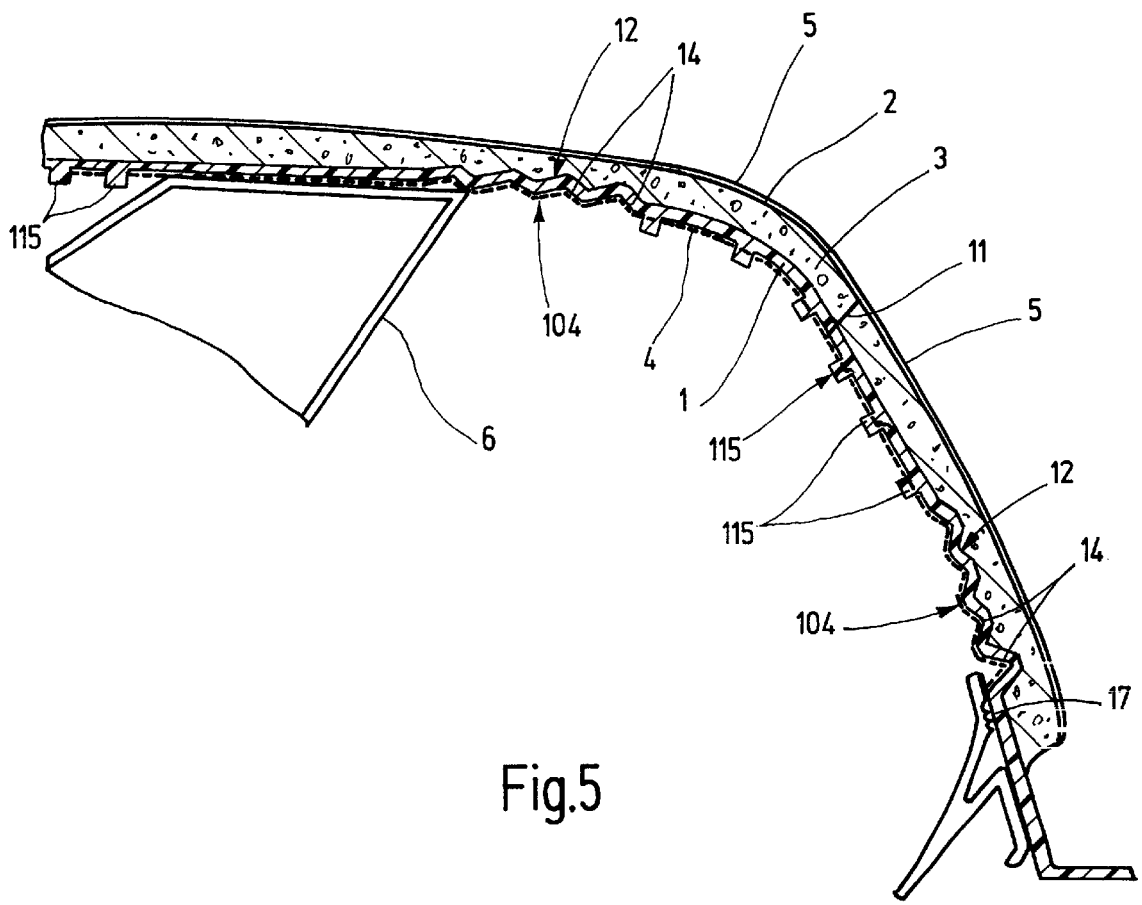
Fig.5

INSTRUMENT PANEL FOR A VEHICLE AND PROCESS FOR PRODUCTION THEREOF

BACKGROUND OF THE INVENTION

1. Field of the Invention

The invention is concerned with an instrument panel or dashboard for a vehicle, comprised of a form stable plastic carrier, a cover layer, and optionally an interlayer of a foam material or the like, with at least one flap-like rupturable part for the airbag of an airbag module, wherein the flap-like rupturable part is defined by scorings or separation lines and a hinge area and is provided with a reinforcement. The invention is further concerned with a process for production of a plastic carrier for an instrument panel, of a vehicle which is reinforced in the area of one or more airbag flaps, and is produced using flowable or injection moldable plastic material and an injection mold die.

2. Description of the Related Art

It is well known to provide in instrument panels at least one cover through which an activated airbag can burst in an appropriate situation. U-shaped separation lines conventionally define a single flap, and H-shaped separation lines are used to define two flaps. The forces which occur during tearing open of the flaps are very large, so that in certain cases during the tearing open of the flaps from the carrier hard break-away pieces can splinter off, which form projectiles launched into the passenger cabin and represent a danger of injury to the passenger. In order to prevent the release of such broken pieces, it has already been proposed to reinforce the flaps or, as the case may be, the instrument panel. It has been proposed for example in DE-A-196 48 138 to glue a reinforcement fabric to both sides of the separation lines on the outer side of the carrier. As an alternative embodiment it has been proposed to provide a fabric or mesh material on the underside of the cover layer along both sides of the tear lines, embedded in the foam material layer provided below the cover layer. In this embodiment a splintering off and launching of broken fragments out of the carrier cannot be prevented. With respect thereto it would be more effective to position the reinforcing material on the outer side of the carrier. In the case of providing the reinforcement on the outer side of the carrier it can however occur, that as a result of the high forces which are associated with the release of the airbag and which are also necessary, the reinforcements can partially release so that their purpose is not, or is only insufficiently, accomplished.

SUMMARY OF THE INVENTION

This is the starting point of the present invention, which addresses the task of so reinforcing the instrument panel in the area of the flap-like rupturable part(s), that a release of carrier fragments is effectively prevented.

This task is inventively solved thereby, that the reinforcement is comprised of at least a perforated and flexible layer, which is permeated by the carrier material in such a manner, that the innermost carrier layer covers the reinforcement layer in the manner of a slight rise or elevation.

In accordance with the invention, the reinforcing material is selected as a material which is capable of being bonded to or embedded in the carrier material, and which by its structure as well as its bonding or embedding effectively prevents the release of carrier break pieces, which could otherwise occur during the opening of the flap(s).

The invention is also concerned with the task of developing a process for production of a carrier for an instrument panel, which makes it possible to effectively reinforce or strengthen the carrier in the area of the airbag flap(s) in simple manner.

As concerns the process for production of the carrier for the instrument panel, the set task is inventively solved thereby, xi that a structure comprised of shallow recesses is provided or integrated in the injection mold die, upon which at least a perforated or open-mesh and flexible layer is introduced for reinforcement prior to injection of the plastic for the carrier.

In this manner the plastic material penetrates through the reinforcing layer in the area of the mold recesses and forms on the inner side of what is subsequently the carrier a structure having a slight elevation, which structure covers over the reinforcing layer. Thereby the reinforcing material is embedded in the carrier material in such a manner that it cannot be released, and a splintering off of fractions of the carrier material is effectively prevented during: an opening of the flaps.

In a preferred embodiment of the invention the perforated or open-mesh flexible layer is a large mesh net or fabric. A net or woven fabric is particularly easy to manipulate in the manufacture of the carrier, is easy to produce in various designs or embodiments and is very effective.

The elevation in the carrier layer or as the case may be the shallow recess in the injection mold die is preferably so selected in its size or width, that its cross section is larger than each of the individual elements—the surrounded perforation interspaces or mesh openings—of the perforated layer or the net or fabric. Therewith it is insured, that the perforated layer or the net or fabric can be embedded without problem in the carrier layer.

The elevation or as the case may be recess should, also for the purposes of supporting a good embedding of the reinforcing material, be generally adapted to conform to the size of the structure of the reinforcing material or the perforations therein, and preferably have a similar pattern, in particular in the form of diamonds or quadrilaterals or even linked circles.

A good embedding of the perforated layer is also aided when it is introduced in such a manner, that the material connections between the perforations are at least largely oriented crosswise to the slight elevation of the carrier layer or, as the case may be, the recess of the injection mold die. In the case of a net or fabric it is particularly preferably the case that it is introduced in such a manner, that its threads or fibers run diagonal to the slight elevation or, as the case may be, recess.

The reinforcement preferably extends from connection points to connection points over the airbag deployment channel for connection with the instrument panel. In order to guarantee a good connection or bonding of this/these plastic part(s) by welding, welding ribs or beads are formed on the carrier, which on their lower side are provided with small ridges which form the welding points. The small ridges are in particular so designed, that they run in the longitudinal direction, or alternatively transverse to the longitudinal direction, of the welding ribs. The reinforcement embeds itself during the manufacture of the carrier below the small ridges, and the secure and permanent welding or fusion between the small ridges and the airbag deployment channel can occur.

For an optimal effect of the reinforcement layer it is advantageous when it extends over the one or more hinge area(s) of the flap-like rupturable part or parts, and preferably extends at least partially over the separation lines.

A particular inventive design of the carrier in the hinge area is also particularly advantageous. Namely, this is provided herein with a notch or groove, via which the strength of the instrument panel is weakened. This groove makes possible a substantially unimpeded opening movement of the flap-like tear-open part without unnecessary demands on the carrier material.

In order not to impede an opening of the flaps, it is further of advantage, when the perforated layer has a corrugated or wave-shape pivot part extending over the hinge area and unfoldable during the opening or unfolding of the hinges of the flap-like rupturable part. A further improvement is achieved when the pivot part is formed of multiple adjacent waves of the perforated layer.

According to a further variation of the invention the instrument panel for the vehicle includes a form-stable plastic carrier, a cover layer, and optionally a preferably foamed intermediate layer, with at least one flap-like separable tear-open part for the airbag of an airbag module, wherein the tear-open part is defined by score lines or separation lines and a hinge area, and is provided with a reinforcement, wherein the reinforcement is comprised of an at least a preferably lattice shaped perforated flexible reinforcement layer, which is permeated by or embedded in the material of the plastic carrier, wherein the plastic carrier preferably covers over the reinforcing layer in the form of a raised grid or lattice network.

BRIEF DESCRIPTION OF THE DRAWINGS

Further characteristics, advantages and details of the invention are now described in greater detail on the basis of the drawings, which schematically show a representation of one illustrated embodiment of the invention. Therein there is shown in FIG. 1 a cross section through an instrument panel in the area wherein two flap-like tear-open parts are formed, FIG. 2 an internal view of the back side of the instrument panel according to FIG. 1, wherein the outer-most layer is partially omitted, so that the reinforcement provided thereunder is visible, FIG. 3 an enlarged view of a hinged area from FIG. 1, FIG. 4 a view of the inside of the instrument panel in the area of the welding ribs, and FIG. 5 a further embodiment of an instrument panel according to the representation of FIG. 1.

DETAILED DESCRIPTION OF THE INVENTION

Figure 1:
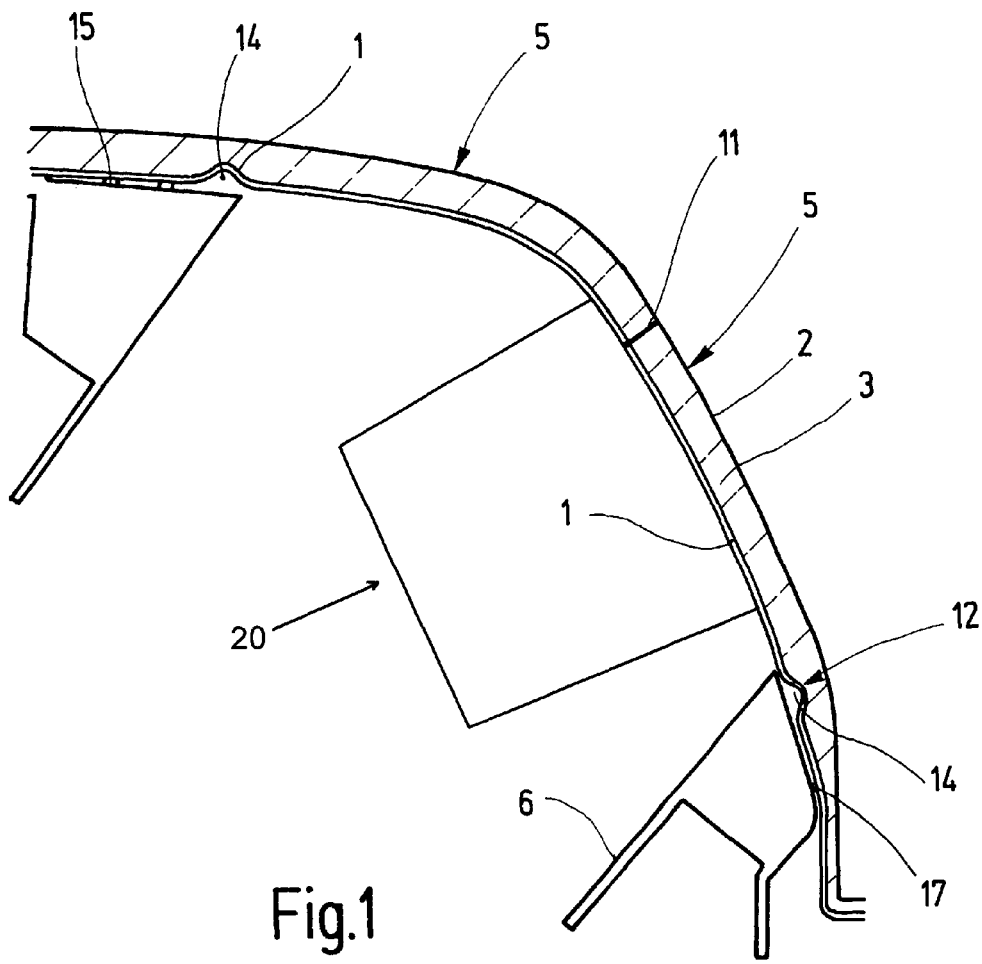

The instrument panel represented in the figures has a conventional design and construction with a carrier 1 extending along its inner side, a cover layer 2, and a foam material layer 3 situated therebetween, which connects the carrier 1 with the cover layer 2. A plastic part connected with the carrier 1 forms in conventional manner a deployment channel 6 for an airbag, which inflates with gas from an airbag module 20. The carrier 1 is a form-stable plastic part, which is preferably produced by injection molding. The cover layer 2 is likewise comprised of a plastic material and can be produced by a slush-process or a spray process. The connection between the cover layer 2 and the carrier 1 occurs in that both finished parts are introduced into a foam tool and their intermediate space is filled with foam.

Figure 2:
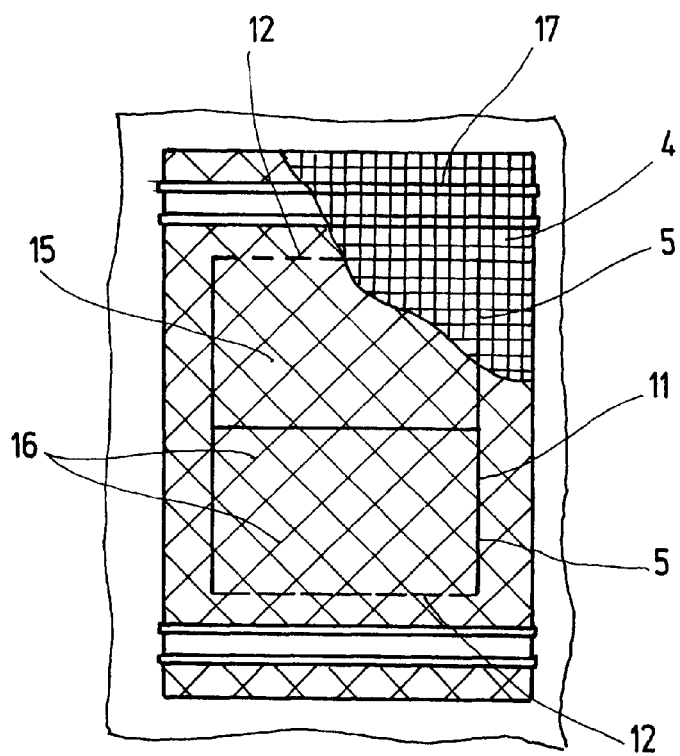

As shown in FIG. 1 taken with FIG. 2, the separation lines 11 running in the illustrated embodiments in an H-shape together with two hinged areas 12 form two flap-like rupturable or tear-apart parts 5. The separation lines 11 are formed by material weaknesses, which in the illustrative embodiments are formed from the backside of the instrument panel by means of a laser or by knife incisions. In order to define the position of the hinge parts 12, which respectively run between the two free ends of the separation lines 11, the carrier 1 in this area is made with a groove 14, so that here the foam material layer 3 between the cover part 2 and the carrier 1 exhibits an noticeably reduced thickness. The grooves 14 are formed simultaneously with the production of the carrier 1, wherein the layer thickness of the carrier material in the area of the groove 14 can be somewhat larger than in the areas outside of the groove 14. The grooves 14 are preferably so designed, that their flanks extend relatively flat, wherein the flank angle can be of any size. The grooves 14 make possible a substantially unimpeded, the carrier material not unnecessarily complicating, opening movement for the two flap-like tear-open or rupturable parts 5. Therewith, in simple manner, not only are the hinge areas 12 produced but rather also intensive force loadings of the material in these areas is avoided.

In carrier 1 a reinforcement is incorporated or embedded, which is formed in accordance with the invention by at least one flexible layer having perforations. This layer is preferably a large-mesh net or fabric 4. The net or fabric 4 is in particular so designed or constructed, that it is comprised of threads crossing each other at an angle of approximately 90°. In a fabric these would be interwoven warp and weft threads or yarns. As starting material for the net or, as the case may be, fabric 4 one could consider for example threads of a stretch resistant plastic.

The large-mesh net or fabric 4 preferably covers the entire area of the flap-like tear-open part 5 and the surrounding areas. In the illustrated embodiment the net or fabric 4 extends therewith also over the separation lines 11, the two hinge areas 12 and the connecting points on one side of each hinge area 12 formed by the welding ribs 17 and extending between the airbag deployment channel 6 and the carrier 1. In this case the net or fabric 4 tears in the area of the separation lines 11 during the opening or rupturing of the part 5. Alternatively it could also be provided, that the large mesh net or fabric 4 extends over at least the largest part of the area of the flap-like tear-open part 5 and over the two hinge areas 12, but however extends only in the area between the side separation lines 11.

As can be seen from FIG. 2, the large-mesh net or fabric 4 is connected or bonded to the plastic material on the inner or back side of the carrier 1 in such a manner, that it is covered by the carrier material layer, which here is in the form of diamond shaped or quadrilateral elevations 15, which are separated from each other by grid-like or lattice-like recesses 16. The structure formed from these elevations 15 and these bordering recesses 16 is substantially larger than the scale or structure of the large-mesh net or fabric 4. This means, that the individual elements of the net or fabric 4 have a smaller area than the individual elements of the diamond :shaped elevations 15 on the carrier 1. FIG. 2 shows this design or embodiment, wherein in the right upper part of this illustration the elevations 15 at the carrier 1 are omitted for easier understanding of the described embodiment. It is also to be recognized, that the large mesh net or fabric 4 is oriented diagonally to the orientation of the grid shaped recesses 16 in the carrier 1.

The structure formed by the elevations 15 and recesses 16 on the inner or back side of the carrier 1 is interrupted by the welding ribs or beads 17. As shown in FIG. 1 and FIG. 2, for the connection of the carrier 1 with the deployment channel 6, two weld ribs 17 are provided respectively on the outside of each hinge area 12 on the carrier 1 which respectively run close to each other and parallel to the respective hinge area 12 and which preferably extend at least over the breadth of the net or fabric 4. The weld ribs 17 are formed integrally during the manufacture of the carrier 1 in the injection mold die. A preferred embodiment of a pair of welding ribs 17 is shown in FIG. 4. The welding ribs 17, which have a uniform thickness in the size range of 2 to 3 mm and a breadth of 5 to 9 mm, are structured onto the outside of the carrier, with ridges 19 extending in the longitudinal direction and, separated from each other by small grooves, of which the upper sides form the weld points.

In the injection mold die for production of the carrier 1 there is on the appropriate surfaces the negative or reverse structure provided for the indicated internal or backside structure of the carrier 1. This means, that diamond or quadrilateral shaped recesses are formed in the mold, which are bordered by ridges forming a grid pattern. Appropriately designed elevations form the hinge areas 12, appropriately designed recesses form the welding ribs 17. The large mesh net or fabric 4 is laid onto this area prior to the introduction or injection of the plastic material. If the fluid plastic material is then injected, it penetrates through the net or fabric 4 into the area of the diamond shaped recesses with formation of the elevations 15. In the area of the recesses forming the welding ribs 17 plastic material penetrates through the net or fabric 4, so that the grooves, which form the longitudinal ridges 19, can be filled only with plastic material.

In the completed instrument panel the deployment channel 6 is connected or bonded rigidly to the welding ribs 17 by vibration welding.

FIG. 5 shows a further embodiment of an instrument panel, wherein identical or functionally identical parts are described using the same reference numbers as in the above described embodiment. A distinguishing feature is comprised therein, that the material of the carrier 1 covers over the inner side of the fabric or, as the case may be, the reinforcing layer 4 in the manner of a raised grid 115. The structure formed by the grid 115 is thereby designed to be complementary to the carrier layer shown in FIG. 2, that is, the grid-like arranged line-shaped elevations border therebetween lying diamond or square shaped recesses, in which the mesh 4 lies free against the carrier 1.

In order not to hinder the unfolding process, the reinforcing layer 4 has in the hinge areas 12 unfoldable wave parts 104.

The wave parts 104 are formed of multiple adjacent connected waves, which lie against the corresponding grooves 14 of the pivot part. This area is kept free of the grid 115, so that the waves of the reinforcing layer 4 can stretch out unhindered in the pivot direction of the flap part 5 during unfolding.

The reinforcement is bonded or embedded in the carrier 1 in such a manner that a breaking-free of the reinforcement from the carrier material during deployment of the airbag is effectively prevented. The reinforcement can therewith guarantee, that a splitting off of fracturing of parts from the carrier material does not occur during tearing open of the flap 5 during the inflation of the airbag.

In a preferred embodiment, the invention concerns an instrument panel for a vehicle, including a form-stable plastic support or carrier 1, a cover layer 2 as well as optionally a preferably foamed intermediate layer 3, with at least one flap-like rupturable burst part 5 for the airbag of an airbag module, wherein the rupturable part 5 is defined by separation lines 11 and a hinge area 12 and is provided with a reinforcement 4, wherein the reinforcement is comprised of at least one grid-shaped perforated flexible reinforcing layer 4, through which the material of the plastic support 1 perfuses, wherein the plastic support 1 covers over the reinforcing layer 4 in the manner of a raised grid 115.

The invention is not limited to the illustrated embodiment. In particular, the reinforcing layer can be a foil or film provided with regularly distributed perforations, or a layer of a suitable material provided in any other manner with holes, through passages, etc. The welding ribs can, instead of longitudinal ridges, also be transverse ridges or be provided as diagonal ridges. It is also possible to respectively provide a single weld rib, which is designed in such a manner, that the necessary secure connection to the airbag deployment channel is guaranteed. The separation or tear-apart lines can also be designed differently, for example, as incisions, scoring, or perforations essentially in the carrier or in the cover layer. In the place of an H-shape, whereby two flaps are formed, it is also possible to provide a U-shape, which forms a single flap. The separation lines could also be formed during the production of the carrier and/or the lid part by a simultaneously formed material weakness (thinner, different material, etc.). The elevations in the carrier inner side could be designed differently.

What is claimed is:

1. An instrument panel for a vehicle, comprising:
   a form-stable plastic carrier having a front side and a back side,
   a cover layer over the carrier and having a front side and a back side,
   an airbag module provided on the back side of said carrier,
   at least one rupturable flap part for the airbag of the airbag module, the rupturable flap part defined by separation lines, a hinge area in said carrier, and a reinforcement,
   wherein the reinforcement is comprised of at least one flexible layer (4) arranged on the back side of the carrier,
   wherein the flexible layer is provided with through-holes,
   wherein the carrier is moulded through the through holes of the flexible layer, and
   wherein the carrier material passes through the front of said flexible layer and covers over at least part of the back of the flexible layer (4) to form slight elevations (15);
   wherein the reinforcement extends over an airbag deployment channel (6), wherein the carrier (1) is provided with welding ribs (17), which are in turn provided with small ridges or elevations (19), and wherein said carrier is fused to said airbag deployment channel (6) at weld points.

2. An instrument panel according to claim 1, further comprising an interlayer comprised of a foam material between said carrier and said cover layer.

3. An instrument panel for a vehicle, comprising:
   a form-stable plastic carrier having a front side and a back side,
   a cover layer over the carrier and having a front side and a back side,
   an airbag module provided on the back side of said carrier,
   at least one rupturable flap part for the airbag of the airbag module, the rupturable flap part defined by separation lines, a hinge area in said carrier, and a reinforcement, wherein the reinforcement is comprised of at least one flexible layer (4) arranged on the back side of the carrier, wherein the flexible layer is provided with through-holes, wherein the carrier is moulded through the through holes of the flexible layer, and wherein the carrier material passes through the front of said flexible layer and covers over at least part of the back of the flexible layer (4) to form slight elevations (15);

wherein the through-holes of said flexible layer (4) form a longitudinally extending pattern, and wherein said flexible layer is introduced into the carrier having the pattern of said through-holes at least in large part diagonal to the elevations (15); and wherein welding ribs provided on the carrier extend in a longitudinal direction, and wherein the welding ribs have ridges or elevations (19) running parallel to or transverse to the longitudinal direction of the welding ribs (17).

4. An instrument panel according to claim 3, further comprising an interlayer comprised of a foam material between said carrier and said cover layer.

5. An instrument panel for a vehicle, comprising:

a form-stable plastic carrier having a front side and a back side, a cover layer over the carrier and having a front side and a back side, an airbag module provided on the back side of said carrier, at least one rupturable flap part for the, airbag of the airbag module, the rupturable flap part defined by separation lines, a hinge area in said carrier, and a reinforcement, wherein the reinforcement is comprised of at least one flexible layer (4) arranged on the back side of the carrier, wherein the flexible layer is provided with through-holes, wherein the carrier is moulded through the through holes of the flexible layer, and wherein the carrier material passes through the front of said flexible layer and covers over at least part of the back of the flexible layer (4) to form slight elevations (15).

6. An instrument panel according to claim 5, wherein the perforated and flexible layer is a large-mesh net or fabric (4).

7. An instrument panel according to claim 6, wherein said net or fabric is comprised of warps and wefts of a stretch resistant thread or yarn.

8. An instrument panel according to claim 6, wherein the slight elevations (15) form individual elements having a footprint area, wherein the footprint area of individual elements is greater than the area of individual openings of the through holes of the net or fabric (4).

9. An instrument panel according to claim 6, wherein the elevations (15) are adapted to conform to the size of the structure of the net or the fabric (4) and form a repeating pattern.

10. An instrument panel according to claim 6, wherein the net or fabric (4) has threads or yarns running diagonal to the elevations (15).

11. An instrument panel according to claim 5, wherein the elevations (15) are in the form of diamonds, quadrilaterals, circles, or a grid.

12. An instrument panel according to claim 5, wherein the through-holes of said flexible layer (4) form a longitudinally extending pattern, and wherein said flexible layer is introduced into the carrier having the pattern of said through-holes at least in large part diagonal to the elevations (15).

13. An instrument panel according to claim 5, wherein the layer (4) provided with through-holes extends over the hinge area (12) of the at least one rupturable flap part (5).

14. An instrument panel according to claim 5, wherein the layer (4) provided with through-holes extends at least partially over the separation lines (11).

15. An instrument panel according to claim 5, wherein the carrier (1) is provided in the hinge area (12) with at least one groove (14) which reduces the strength of the instrument panel from the inner side.

16. An instrument panel according to claim 5, wherein the flexible layer (4) includes an unfoldable wave-shaped pivot part extending over the hinge area (12) and unfoldable during opening of the rupturable flap part (5).

17. An instrument panel according to claim 16, wherein the pivot part is formed by multiple adjacent connected waves of the flexible layer (4).

18. An instrument panel according to claim 5, further comprising an interlayer comprised of a foam material between said carrier and said cover layer.

19. An instrument panel for a vehicle, comprising:

a form-stable plastic carrier having a front side and a back side, a cover layer over the carrier and having a front side and a back side, an airbag module provided on the back side of said carrier, at least one f-lap rupturable for the airbag of the airbag module, the rupturable flap part defined by separation lines, a hinge area in said carrier, and a reinforcement, wherein the reinforcement is comprised of at least one flexible layer (4) arranged on the back side of the carrier, wherein the flexible layer is provided with through-holes, wherein the carrier is moulded through the through holes of the flexible layer, and wherein the carrier material covers over part of the back of the flexible layer (4) to form a grid pattern (115) extending over an area of the at least one rupturable flap part.

20. An instrument panel according to claim 19, further comprising an interlayer comprised of a foam material between said carrier and said cover layer.

\* \* \* \* \*